United States Patent [19]

Nadolink

[11] Patent Number: 5,359,574
[45] Date of Patent: Oct. 25, 1994

[54] ELECTROMAGNETICALLY ACTIVATED COMPLIANT WAVY-WALL

[75] Inventor: Richard H. Nadolink, Portsmouth, R.I.

[73] Assignee: The United States of America as represented by the Secretary of the Navy, Washington, D.C.

[21] Appl. No.: 113,378

[22] Filed: Aug. 27, 1993

[51] Int. Cl.$^5$ ............................................... H04K 3/00
[52] U.S. Cl. ............................................... 367/1
[58] Field of Search ............... 367/1, 168; 244/204, 244/130; 381/71, 86; 114/67 R; 310/338

[56] References Cited

U.S. PATENT DOCUMENTS 4,363,991 12/1982 Edelman ........................... 310/338
4,516,747 5/1985 Lurz ................................... 244/204

Primary Examiner—Daniel T. Pihulic
Attorney, Agent, or Firm—Michael J. McGowan; Prithvi C. Lall; Michael F. Oglo

[57] ABSTRACT

Electromagnets are disposed in an elastomeric coating affixed to a body exposed to a fluid. Controllable magnetic forces created by the electromagnets produce a wavy-wall configuration in the surface of the coating which may be static, dynamic, or static in part and dynamic in part, and which interfaces with the fluid to controllably alter noise, turbulence and drag characteristics of the body mechanically. Electrodes may be fixed on the surface of the coating to produce electric force fields for interacting with the magnetic fields and the wavy-wall, to produce magnetohydrodynamically generated Lorentz forces which controllably further alter noise, turbulence and drag characteristics of the body.

11 Claims, 5 Drawing Sheets

ELECTROMAGNETICALLY ACTIVATED COMPLIANT WAVY-WALL

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

This invention is drawn to the field of fluid mechanics, and is directed more particularly to an electromagnetically activated compliant wavy-wall, operable to control drag and noise of a body moving relative to a fluid medium.

2. Description of the Prior Art

Previous wavy-wall devices have included a number of mechanical and fluidic methods to produce distortion and motion of a surface immersed in a fluid medium. Imbedded piezo-electric transducers underlying layers of miscoelastic fluids and electro-rheological fluids, surface layers of polymer films with properties similar to piezo-electric elements, and a large number of mechanical and thermal devices, have been used in controlling in surface geometry and movement of compliant walls adjacent to flowing fluid. A primary objective of such devices is drag reduction. However, in certain instances it is desirable to increase drag, or otherwise alter the boundary layer of a body operating in a fluid. The noise, or acoustic signature, of a body can be modified in this manner.

In addition to mechanical action, it is possible to control the noise and turbulence characteristics of a body operating in a fluid medium via electrical and magnetic means. Previous methods of producing magnetic, electric, and electromagnetic forces in adjacent fluid flows used only static surfaces at which the magnetic, electric and/or electromagnetic forces were produced.

SUMMARY OF THE INVENTION

An object of the present invention is to provide an electromagnetically activated wavy-wall apparatus wherein magnetic forces are activated to cause the wall to assume a wavy configuration, to alter the noise and turbulence characteristics of a body operating in a fluid medium.

Another object of the invention is to provide such a wavy-wall apparatus having a body covered with a compliant elastomeric material proximate to the interface where turbulence and noise are to be controlled, and having electromagnetic means for generating a controlled undulation of the compliant material.

A still further object of the invention is to provide such apparatus having, in addition, means for establishing electric force fields which, in cooperation with the magnetic force fields, act upon an electrically conductive fluid medium to affect the boundary layer characteristics of the body in the medium.

With the above and other objectives in view, as will hereinafter appear, there is provided apparatus for selectively affecting turbulence and noise characteristics of a body operating in a fluid medium, the apparatus comprising a coating of compliant material covering the body at least in part and electromagnetic means for generating magnetic forces operative to deform the coating into a wavy-wall configuration having the selected characteristics.

In accordance with a further feature of the invention, there is provided in the apparatus described immediately above, electrode means disposed on the coating for generating electrical force fields which interact with the magnetic force fields and the wavy-wall to magnetohydrodynamically produce a Lorentz force at the wavy-wall, of controlled characteristics which adds energy to the fluid medium, selectively altering the turbulent boundary layer, and affecting the turbulence along the interface of the wavy-walled body and its fluid medium.

The above and other features of the invention, including various novel details of construction and combination of parts, will now be more particularly described with reference to the accompanying drawings and pointed out in the claims. It will be understood that the particular devices embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent.

In the drawings.

DESCRIPTION OF THE PREFERRED EMBODIMENTS

Figure 2:
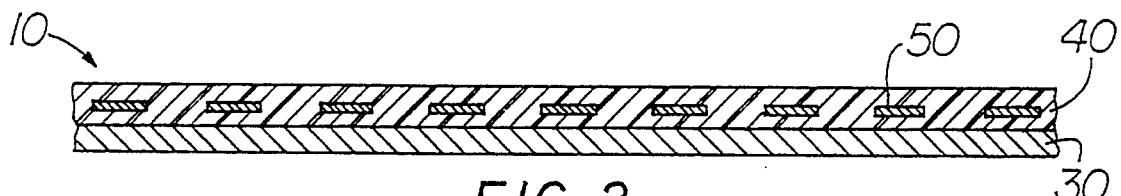
FIG. 2 is a sectional view of the wavy-wall apparatus of FIG. 1, shown in an inactive state.

Referring to FIG. 2, it will be seen that a section of a body 10 is shown. In a preferred embodiment, the body 10 may be the hull of a submarine or torpedo. However, the same novel apparatus for flow and noise control are envisaged for any submersible, including (i) axisymetric bodies and bodies of revolution; (ii) below waterline hull forms of surface ships; (iii) interior surfaces of tubes and pipes; and (iv) any other body having a boundary wall which comes in contact with a fluid with relative motion between the body and the fluid.

Fluid 20 (FIG. 1) preferably is a conductive fluid, although it need not necessarily be conductive to be influenced by the wavy-wall effects. Furthermore, fluid 20 need not be homogeneously conductive, if conducting particles or ejectants are present or maintained in the flow for the purpose of interaction with the magnetic and electric fields of the invention.

The exterior of the body 10 includes a solid wall boundary 30 covered with a compliant elastomeric coating 40. In the inactive state (FIG. 2), the elastomeric coating 40 is smooth, yet resilient, and not unlike the skin of certain marine mammals, including porpoise or cetacea (killer whales).

Figure 1:
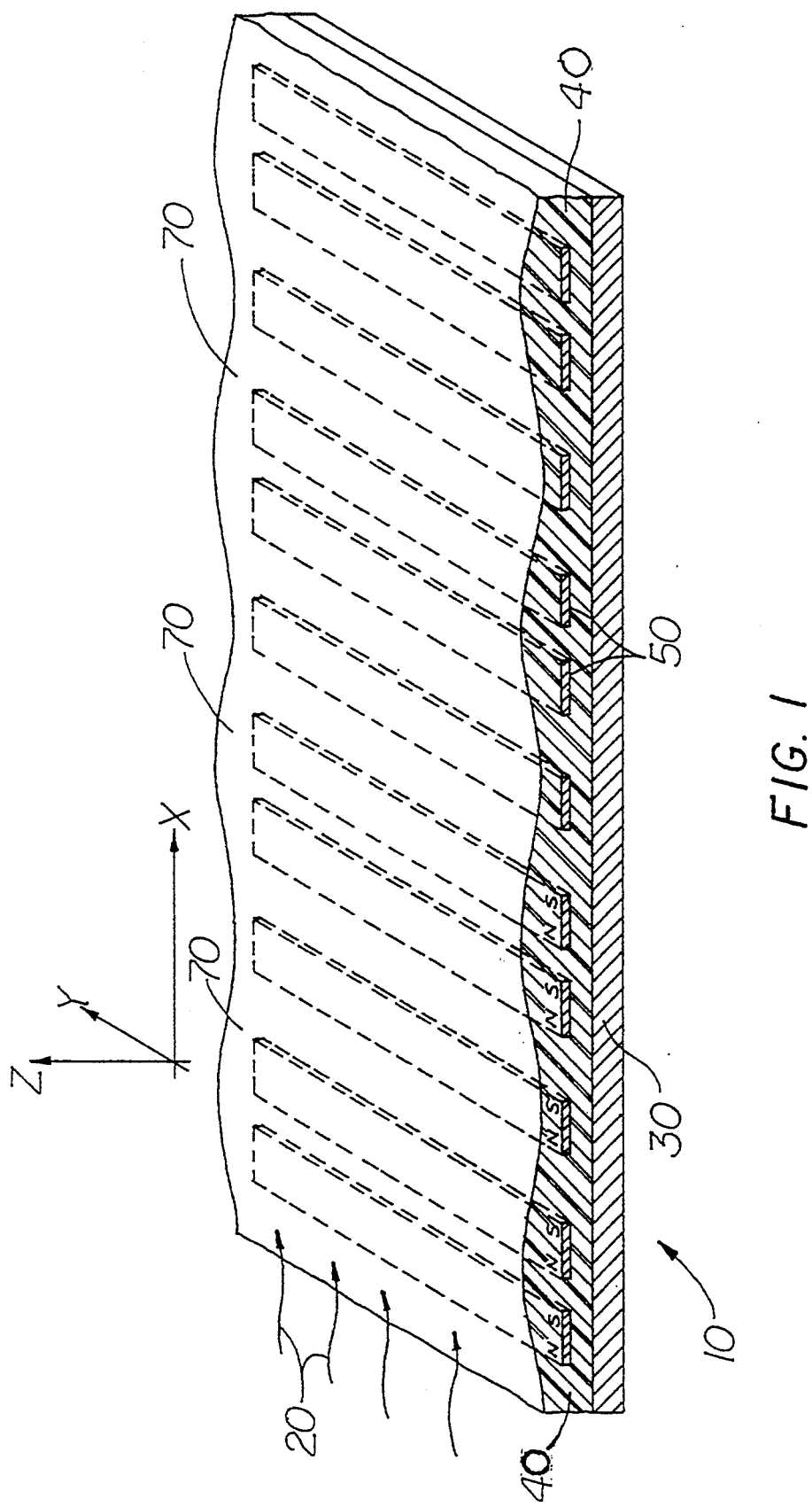
FIG. 1 is a sectional, oblique, and diagrammatic view of one form of wavy-wall apparatus illustrative of an embodiment of the invention.
Figure 6:
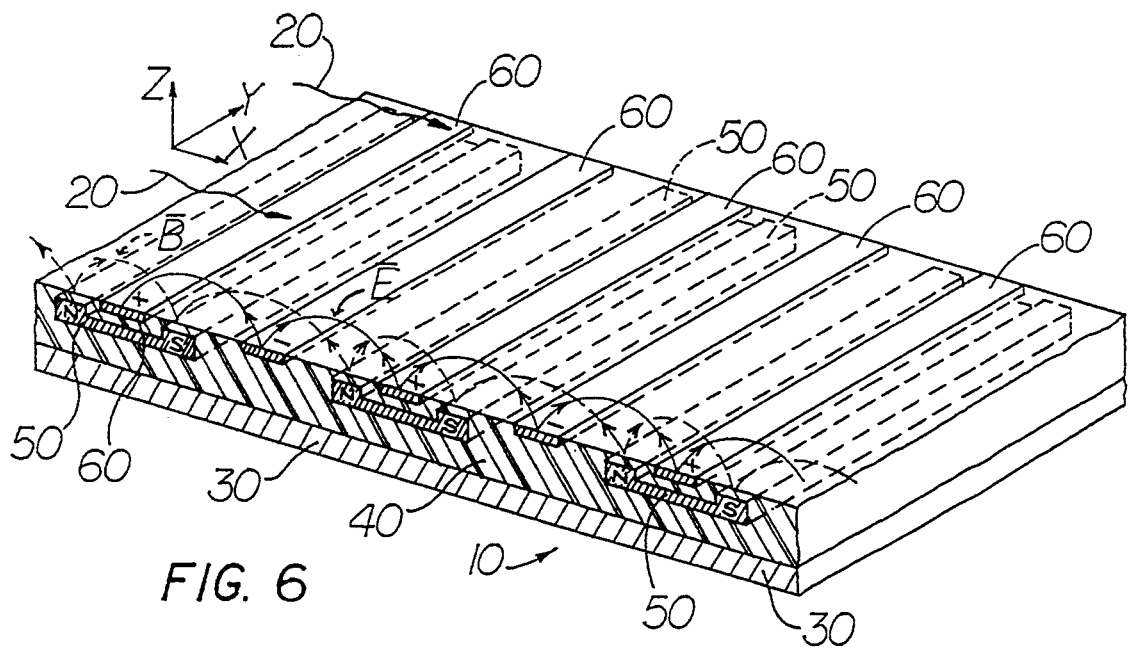
FIG. 6 is a sectional, perspective and diagrammatic view of an alternative embodiment of wavy-wall apparatus prior to shape alteration.

In FIGS. 1 and 6 of the drawings, the X direction is that of the mean fluid flow; Y is perpendicular to the flow but parallel to the wall 30 (i.e. cross stream); and Z is perpendicular to the wall, going radially outward in a body of rotation and, as will be apparent, is the direction of displacement of the wall 30.

Desirable elastomers for the coating 40 are those relatively transparent to magnetic fields. Otherwise, any degree of isotropy, homogeneity or anisotrophy is acceptable, according to the desired application. The Jonal Laboratory of Meriden, Conn., provides elastomers suitable for various components used in fabrication of the preferred embodiments, including silicone, JL-77-154-1; fluorosilicone, JL-79-2437-3; fluorocarbon, JL-79-145-1; and urethane, JL-79-151-1. Variations of the silicone are available which may be useful to act as an electromagnetic shield for internal components.

An alternative silicone product is manufactured by General Electric, and Allied Resin Corp., East Weymouth,. Mass. and is known by the tradename "RTV". An additional silicon product, widely used for molding applications, is SILASTIC by Dow Corning Corp., Midland, Mich.

Figure 7:
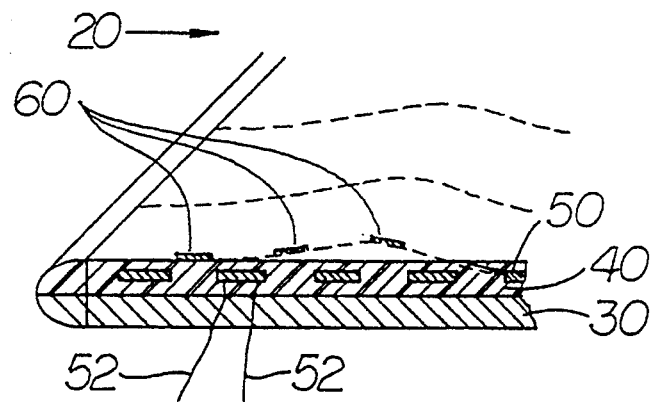
FIG. 7 is a sectional, oblique view of the apparatus of FIG. 6, shown in phantom in a shape-altered state.
Figure 8:
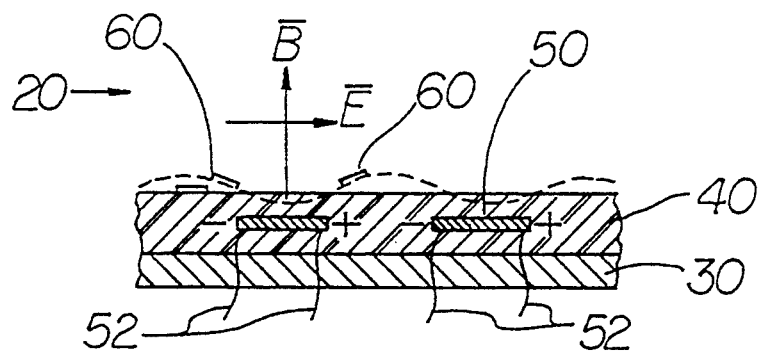
FIG. 8 is a sectional and diagrammatic view of the apparatus of FIG. 7.
Figure 9:
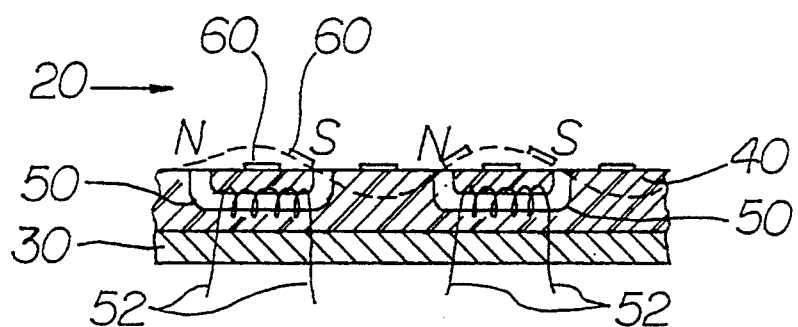
FIG. 9 is similar to FIG. 8, but illustrates an alternative embodiment.

Embedded within the elastomer 40 are electromagnets 50 which may be essentially flat bars, as shown in FIG. 1, or U-shaped bars, as shown in FIG. 6. The electromagnets 50 may lie either wholly within the elastomer (FIGS. 1–5) or in such fashion that pole pieces thereof are exposed to fluid 20 (FIG. 9). Electrical connection to the several electromagnets is preferably by wires 52, that pass in sealing relation through wall 30 (FIGS. 7 and 8). The wires 52 may extend singly through wall 30, as illustrated, or may be gathered such that groups of wires extend in one or more conduits through one or more apertures in the wall. The wires may be connected to the magnets as shown in FIGS. 7 and 8, or may be coiled around the magnets, as shown in FIG. 9. Electrical activation of the electromagnets is preferably by A.C. and/or D.C. signal generators, not shown, connected to the wires 52.

Figure 3:
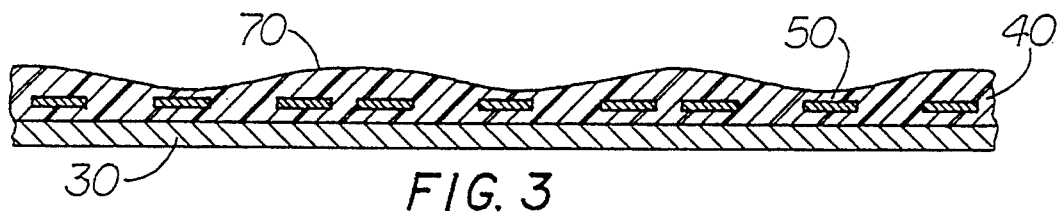
FIG. 3 is a sectional view, similar to FIG. 2, but showing the wavy-wall apparatus activated by alternating current.
Figure 4:
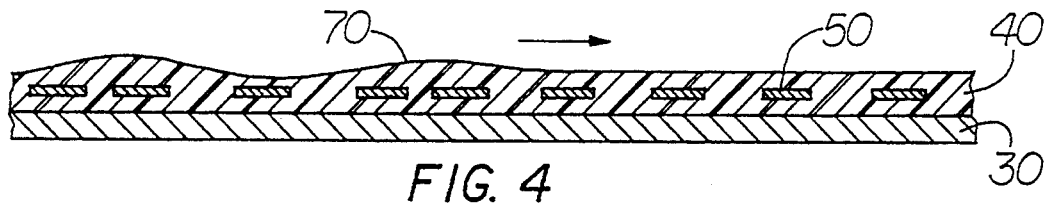
FIGS. 4 and 5 are sectional views, similar to FIG. 3, but showing the wavy-wall apparatus activated by direct current in a timed sequential manner to produce travelling waves.
Figure 5:
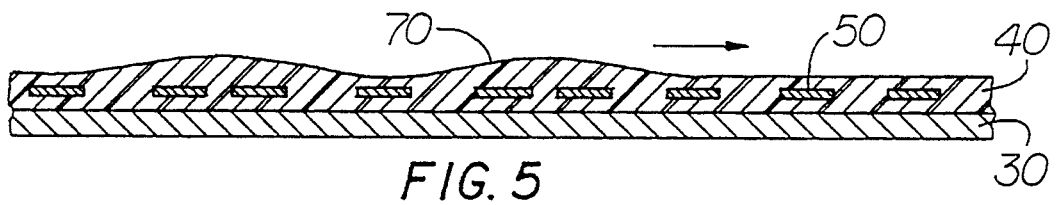

In operation, and in dependence on the frequency of the applied signal, whether the static D.C. frequency or the time varying frequency of an A.C. signal, electromagnets 50 cooperate to so attract each other as to buckle elastomer 40 into the shape of a wavy-wall, designated 70 (FIGS. 1 and 3). The wavy-wall 70 is static for applied A.C. signals, as seen in FIGS. 1 and 3, and mechanically travelling for timed sequentially triggered D.C. signals, as seen in FIGS. 4 and 5.

The wavy-wall 70 may be selectively "frozen" in a desired configuration, either throughout the entire wall or in particular regions, or may be made to exercise "travelling waves", either along the direction of flow or cross-wise of the direction of flow. Generally, there is no restriction as to the number or placement of electromagnets 50, such that a fully three dimensional wavy surface can be obtained by energizing opposed magnets 50 to cause movement along the X axis in addition to that of the Y and Z axes.

Referring now to FIG. 6, a perspective view of an alternative embodiment of wavy-wall apparatus is shown. Imbedded within the elastomer 40 are the electromagnets 50, as described above. In addition, electrodes 60 are disposed in or on the surface of elastomer coating 40.

The surface electrodes 60 are secured to the elastomer coating 40 in various fashions. In a layup mold process, a film-like electrode 60 is placed on the final uncured elastomer 40 layer, with provision for power leads (not shown) necessary for energizing the electrodes 60 having been already made. With this technique, it is important to provide the electrodes 60 with suitable flexibility on the elastomer's surface, somewhat like ribbons, such that the movement of the elastomer coating 40 does not distort the electrodes or dislodge them. In another embodiment, electrodes 60 are painted onto the outermost layer of cured elastomer 40. In either embodiment, the width and extent of an electrode 60 is small compared to a full cycle of the distorted wall, as shown in FIGS. 7–9. The electrodes 60 are applied to the elastomer coating 40 so that they are proximate to fluid 20, one electrode defining an anode, another a cathode, alternatively along the surface of elastomer 40.

When the elastomer coating 40 is distorted by the magnetic field B (FIGS. 6, 8 and 10), produced by the electromagnets 50, and electrodes 60 are activated by a signal source, an electric field E (FIGS. 6, 8 and 10) is created within and about the peaks and valleys of the wavy-wall. The interaction of the magnetic field B, provided by the electromagnets 50, with the electric field E, produced by the electrodes 60, when operating in a conducting fluid medium, exerts a body force represented by the following equation:

$$L = Eq + qv \times B$$

where L=Lorentz Force, E=electric field strength, B=magnetic field strength, q=charge and v=induced velocity, and produces a velocity or thrust on electrically sensitive elements, such as ions.

The controlled creation of Lorentz forces is a powerful flow control mechanism. The maximum body force is created in the valleys of the wavy-wall when the magnetic field is perpendicular to the electric field. These forces may be used to control the flow and alter the near field velocity profiles which control wall shear stress and wall pressure fluctuations, thereby reducing drag and noise. These forces, in combination with the physical motion of the wavy-wall 70, can act as a propulsion means.

Figure 10:
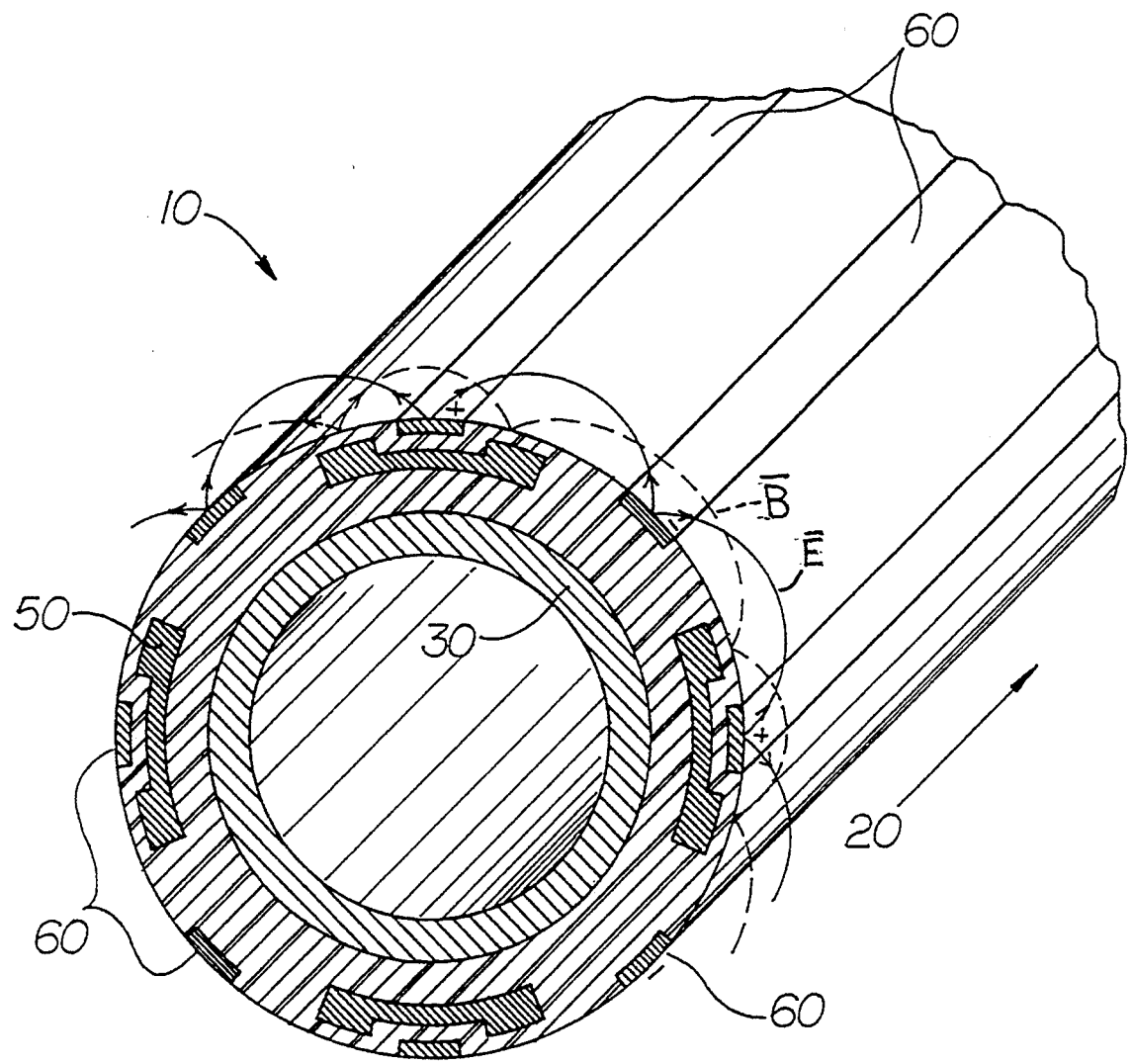
FIG. 10 is a sectional, oblique view illustrative of another alternative embodiment of wavy-wall apparatus.
Figure 11:
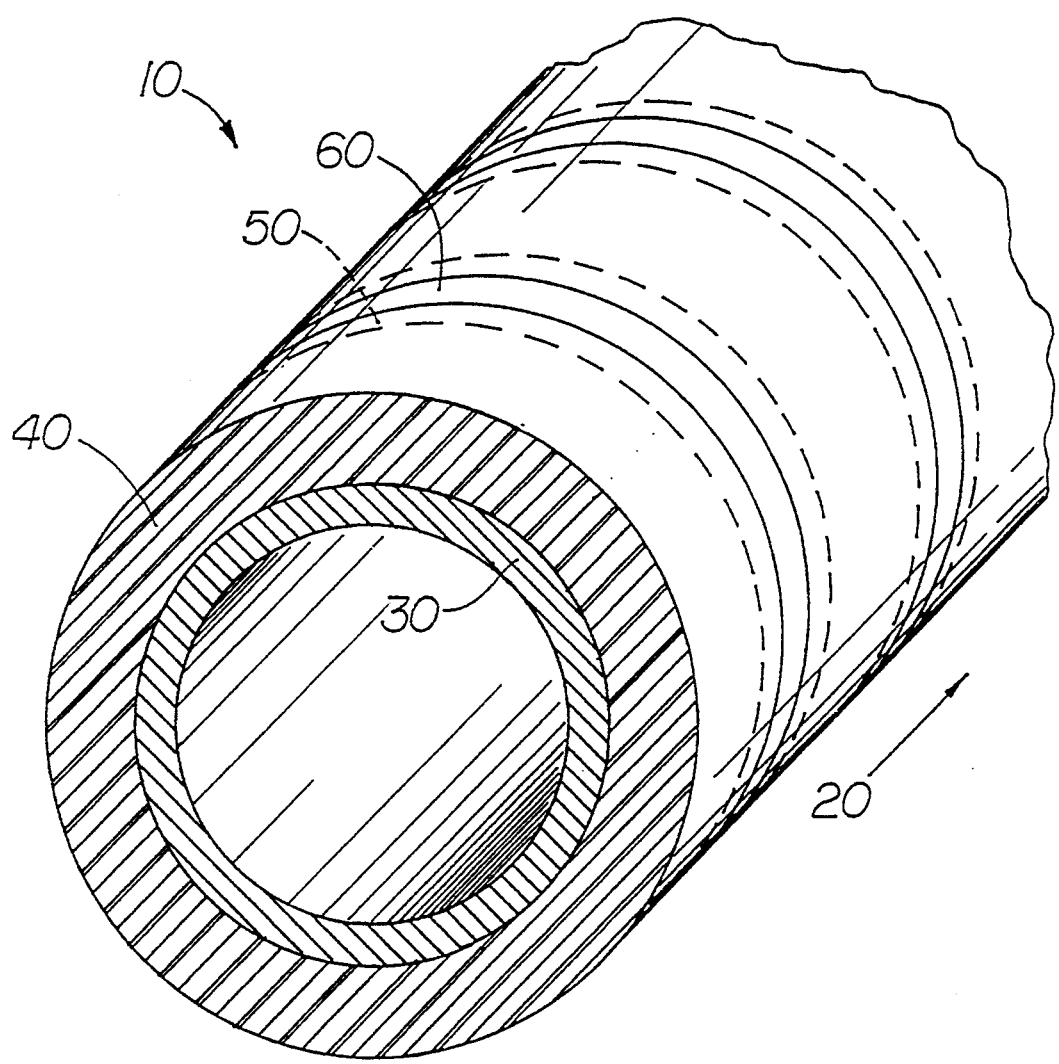
FIG. 11 is a sectional, oblique view illustrative of still another alternative embodiment of wavy-wall apparatus.

Referring to FIG. 10, there is seen the body 10, in axisymmetrical, or cylindrical configuration, with the electromagnets 50 and electrodes 60 aligned with the direction on flow. In this arrangement, the surface undulations, or waves, created by magnetic forces, are formed so as to be oriented along the axis of the cylinder, or lengthwise of the cylinder. The wariness produced in the body 10 resembles the formation of waves and troughs oriented along the direction of flow. In FIG. 11, there is shown a cylindrical body having the electromagnets 50 and electrodes 60 disposed circumferentially, to form waves circumferentially of the body.

With the orientation of the magnets and electrodes as described herein, the orientation of the induced Lorentz force changes in accordance with changes in the vector equation, i.e., the directions of the electric and magnets field vectors which are modulated by the movement of the walls. As presently understood, the Lorentz force produces a total effect on the flow selectively producing reduction or increase in turbulence, and reduction or increase in drag or noise. The Lorentz-induced force effects can only be realized when an electrolyte, such as sea water, is the working fluid. In the case of fresh water, for instance, there would be realized only the magnetically driven wavy-wall which does not depend on the conductivity of the medium. Thus, the possibilities that exist for flow modification and control are manifest, given the plurality of geometries induced.

The wavy-wall 70 of the present invention is fabricated in the following manner. Electromagnets 50 are placed in elastomer coating 40 by a molding process providing for proper access to the electric power wires. The resultant compliant elastomeric film with imbedded electromagnets is then fastened to a fixed or semi-fixed wall 30 by an adhesive, or may be molded directly to the wall 30 at the outset. This process can be accomplished by a standard "layup" procedure wherein liquid elastomer 40 is cured on a wall 30 and allowed to cure using a variety of techniques well known in the art.

A simple piecemeal construction process can also be used in which all component parts are fabricated from appropriate materials, then fastened together using mechanical or adhesive methods. The best results are obtained when electromagnets 50, and elastomer coating 40, are integrated and secured to wall 30 with the greatest degree of homogeneity in the boundaries, such that predictable movement can be made without dislocation or voids.

While the currently preferred embodiments are directed at a body 10 covered in significant part with a wavy-wall, it is also envisaged that similar techniques can be employed in a more restrictive manner. Small riblets, which reduce surface drag slightly, and riblet coatings for this purpose, may be used. In accordance with the instant invention, a similar static of dynamic riblet surface may be obtained on a microscale using conductive wires as electromagnets or permanent rare earth magnets imbedded in an elastomer.

These and other examples of the concept of the invention illustrated herein are intended by way of example and the actual scope of the invention is to be determined solely from the following claims.

What is claimed is:

1. Apparatus for selectively affecting turbulence and noise characteristics of a body operating in a fluid medium, said apparatus comprising:
   a coating of compliant material covering said body at least in part; and
   a plurality of electromagnets embedded in said coating for generating magnetic forces operative to deform a surface of said coating into a wavy-wall having selected characteristics.

2. The apparatus of claim 1, wherein said body is a marine vessel.

3. The apparatus of claim 1, wherein said wavy-wall and said magnetic forces controllably affect said turbulence and noise characteristics.

4. Apparatus for selectively affecting turbulence and noise characteristics of a body operating in a fluid medium, said apparatus comprising:
   a coating of compliant material covering said body at least in part;
   electromagnetic means for generating magnetic forces operative to deform a surface of said coating into a wavy-wall having selected characteristics; and
   means disposed at least in part on said coating for generating an electric field in said medium, wherein said deformation in said surface of said coating creates a Lorentz force effect to alter said turbulence and noise characteristics of said body.

5. Apparatus for selectively affecting turbulence and noise characteristics of a body operating in a fluid medium, said apparatus comprising:
   a coating of compliant material covering said body at least in part;
   means disposed in said coating for electromagnetically generating magnetic forces that act to deform said coating into a wavy-wall configuration with selected characteristics; and
   means on said coating for generating electric fields that cooperate with said magnetic forces to magnetohydrodynamically alter said turbulence and noise characteristics of said body.

6. The apparatus of claim 5, wherein said body is a marine vessel.

7. The apparatus of claim 6, wherein said marine vessel is an underwater vessel.

8. The apparatus of claim 5, wherein said means for electromagnetically generating magnetic forces comprises a plurality of electromagnets.

9. The apparatus of claim 8, wherein said means for generating said electric fields comprise electrodes, and wherein said wavy-wall and said magnetic forces and said electric fields combine and selectively affect said turbulence and noise characteristics.

10. The apparatus of claim 9, wherein said electrodes are painted on said coating.

11. The apparatus of claim 9, wherein said electrodes are embedded in said coating.

* * * * *